July 6, 1965  J. E. LOOMIS  3,193,040
DRIVE-STEER WHEEL

Filed July 31, 1961  5 Sheets-Sheet 2

INVENTOR.
JACK E. LOOMIS
BY
ATTY.

INVENTOR.
JACK E. LOOMIS
BY J.C. Wiessler
ATTY.

July 6, 1965 J. E. LOOMIS 3,193,040
DRIVE-STEER WHEEL
Filed July 31, 1961 5 Sheets-Sheet 5

INVENTOR.
JACK E. LOOMIS
BY
ATTY.

United States Patent Office 3,193,040
Patented July 6, 1965

3,193,040
DRIVE-STEER WHEEL
Jack E. Loomis, Kalamazoo, Mich., assignor to Clark Equipment Company, a corporation of Michigan
Filed July 31, 1961, Ser. No. 129,204
5 Claims. (Cl. 180—66)

This application is a continuation-in-part of my co-pending application Serial No. 787,566, filed January 19, 1959, now abandoned.

This invention generally relates to power operated lift trucks and more particularly to an improved structure and arrangement of driving and steering means for trucks.

Power operated lift trucks to which the present invention is particularly adaptable have been known for some time. Such presently known trucks commonly are comprised of the primary elements of a main wheel supported frame upon which is mounted a mast carrying vertically reciprocable load engaging forks and one of the wheels is steerable for maneuvering the truck and is also powered by externally located power means including gearing means by which the powered wheel may be driven either forwardly or reversely.

The present invention is particularly concerned with a novel structure and arrangement for the driving and steering wheel for such a lift truck whereby a more compact and efficient truck may be economically manufactured.

As will be realized by those skilled in the art, the direction of the drive wheel is continually being changed while the truck is being positioned to engage or deposit a load. Such change being both about an axis normal to the axle of the wheel for steering, and also about the axle of the wheel for driving the truck either forwardly or rearwardly. The prior art trucks have, therefore, been provided with expensive and space consuming reverse gear arrangements in connection with the driving and steering wheel thereof.

It is a primary object of the present invention to provide a novel structure and arrangement of the driving and steering wheel for a truck of the above-mentioned type which eliminates the requirement for costly and space consuming reverse gear arrangement.

It is a further object of the present invention to provide a driving and steering wheel for a truck of the above-mentioned type which incorporates a torque converter and planetary gear reduction within the confines of the wheel itself.

It is a still further object of the present invention to provide a driving and steering wheel of the above-mentioned type including a torque converter and gear reduction whereby the driving or output torque of the wheel is automatically adjusted to meet the driving conditions with a constant input torque thereto.

It is a still further object of the present invention to provide a wheel arrangement of the above-mentioned type wherein the torque converter and reduction gearing are substantially totally enclosed within the confines of the wheel itself thereby to utilize existing space whereby the over-all size of the vehicle may be reduced.

It is a still further object of the present invention to provide a wheel arrangement of the above-mentioned type wherein the torque converter and speed reduction gearing are adapted and arranged to define a closed circulation path for fluid, such fluid being utilized as a lubricant for the speed reduction gearing and as the fluid supply for the torque converter.

It is a still further object of the present invention to provide a wheel arrangement of the above-mentioned type wherein the torque converter and reduction gearing are so adapted and arranged as to cooperate with other structural elements of the wheel to define a tortuous passage for the circulation of air thereabout to thereby dissipate heat generated within the criculating fluid.

The above and further objects and advantages of the present invention will become more readily apparent from the following detailed description of one illustrative embodiment thereof as shown in the accompanying drawing forming a part hereof and wherein.

Figure 2:
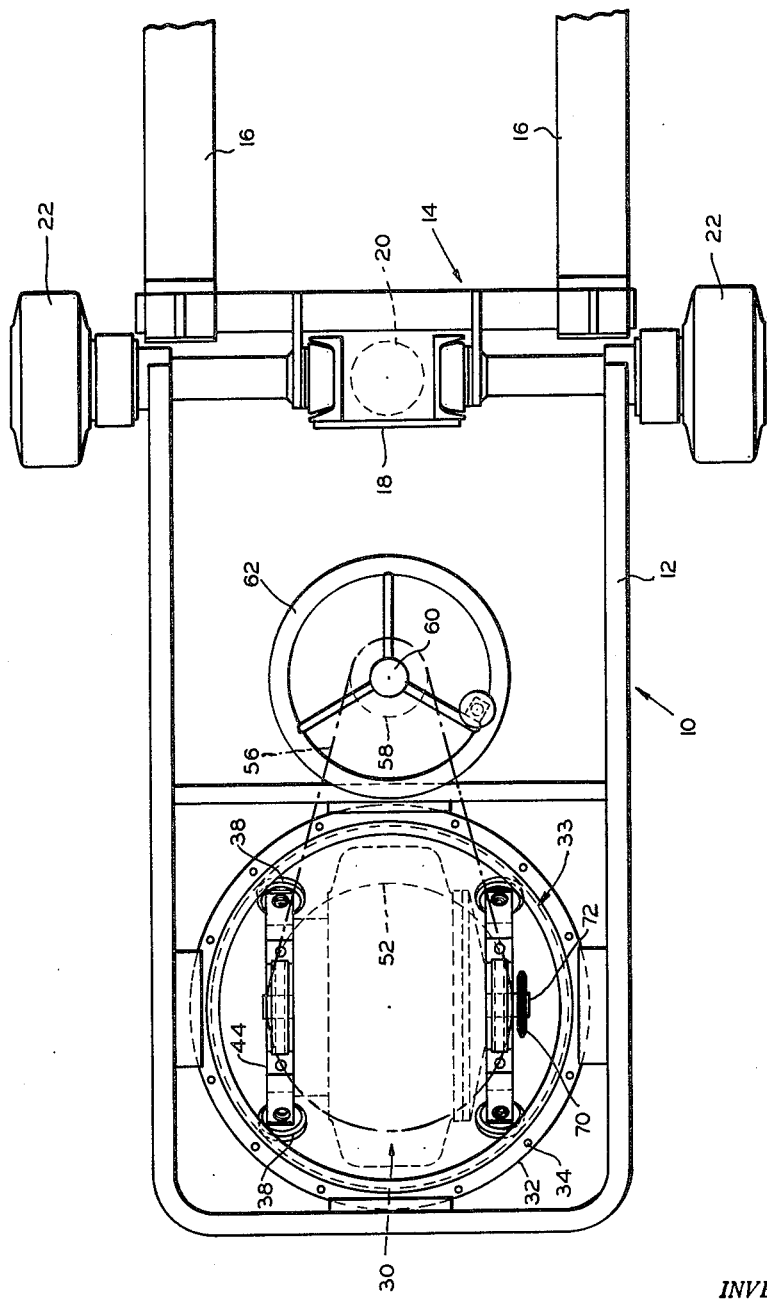
FIG. 2 is a top plan view of the vehicle illustrated in FIG. 1 and showing additional details of the arrangement incorporating the novel structure of the present invention.

Referring now to the drawings, there is indicated generally by the reference numeral 10 a power operated lift truck which comprises a main frame 12 and load supporting means 14 projecting forwardly therefrom. The load supporting means in the specific embodiment shown includes a pair of horizontal forks 16 vertically movable relative to the main frame 12 upon a mast structure 18 through the actuation of a hydraulic piston and cylinder assembly 20 (FIG. 2). The load supporting forks 16 as well as the forward end of the main frame 12 are supported by a pair of ground engaging rollers or wheels 22 in a manner which is well-known in the art.

The main frame 12 of the truck 10 in the present instance is provided with an operators' platform 24 upon which is secured a suitable operator's seat such as indicated at 26.

Rotatably mounted, about a vertical axis in the main frame 12 is a drive motor unit, indicated generally by the reference numeral 28 and a ground engaging wheel indicated generally by the reference numeral 30. The drive motor unit 28 and the ground engaging wheel 30 are mounted upon the main frame 12 so as to allow the wheel 30 to revolve 360° about a vertical axis and restrict relative vertical movement of the wheel relative to the frame.

Figure 3:
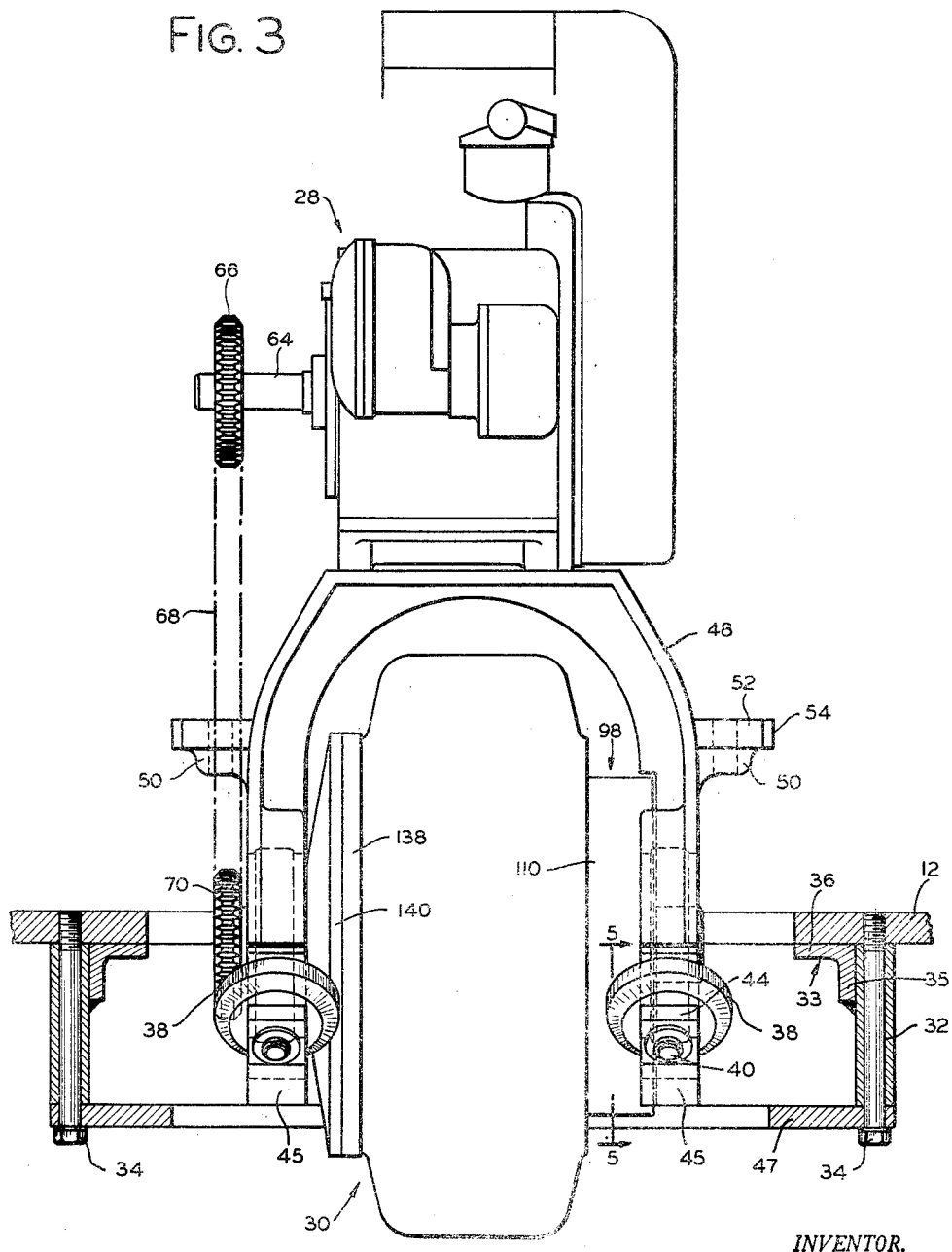
FIG. 3 is an enlarged sectional view as seen substantially along the line 3—3 of FIG. 1 and showing the general arrangement of the novel wheel structure and its relationship to the power means of the lift truck.
Figures 4, 5:
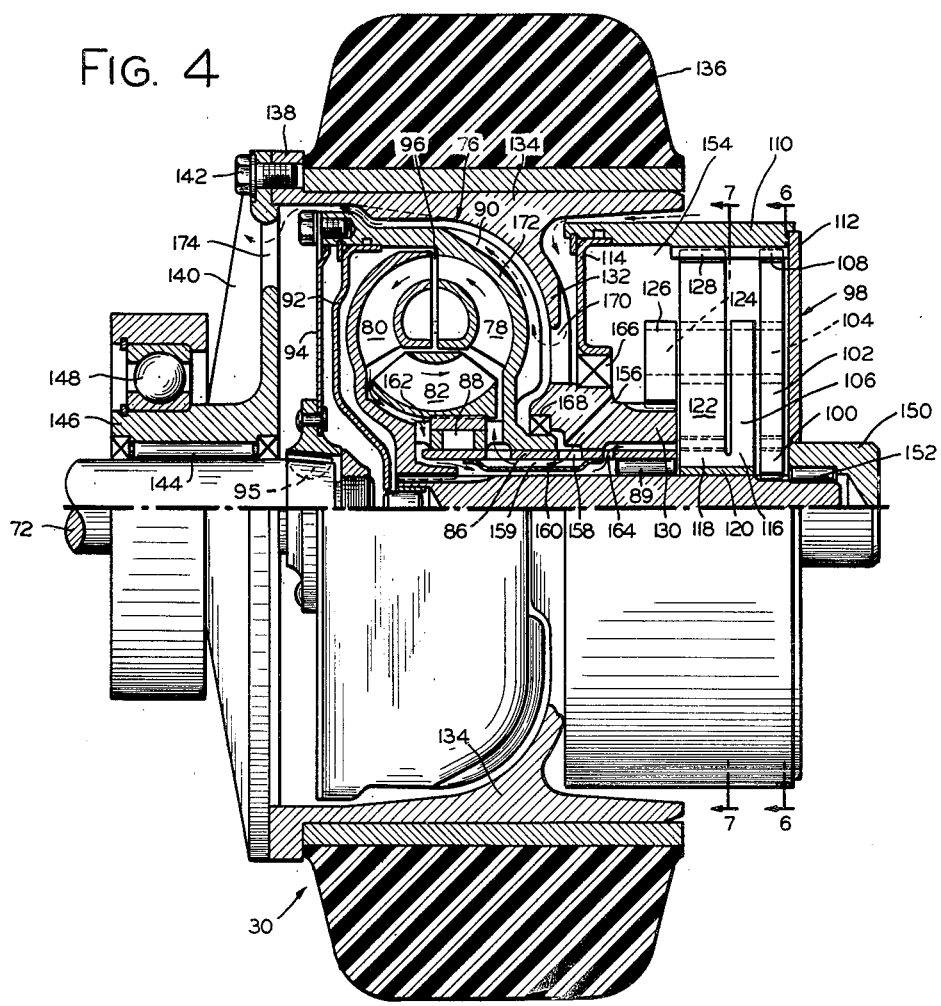
FIG. 4 is an enlarged partial cross-sectional view illustrating the interior arrangement of the wheel structure including elements of the torque converter and reduction gearing; the view taken being substantially along the irregular line 4—4 of FIG. 1.
FIG. 5 is an elevational view of one of the pairs of roller elements for rotatably mounting the driving and steering wheel upon the main frame of the truck; the view being substantially as seen along the line 5—5 of FIG. 3.

As may be seen in FIGS. 2, 3 and 5 such mounting generally comprises a vertically extending circular ring member 32 which is nonrotatably secured to the main frame 12 by means of a plurality of circumferentially spaced bolts 34. Secured to the ring member 32, conveniently by welding, is a circular ring 33 of right angle cross-section having a vertically extending wall 35 and a horizontally extending wall 36. The internal surfaces of the walls 35 and 36 of the ring 33 define a track which is engageable by a plurality of circumferentially spaced angularly disposed rollers 38. The rollers 38 number four in the specific embodiment of the invention shown and are mounted on suitable bearings which surround angularly disposed supporting shafts 40. The upper and lower ends of the shafts 40 have resilient ring members 42 disposed thereabout which are fixed in a pair of vertically spaced bracket or support members 44 extending horizontally in chord-like fashion across the interior of the ring 33. The shafts 40 are maintained in proper position by means of conventional washers and retaining rings.

The bracket members 44 are provided with lugs 45 which are adapted and arranged to slidably engage the upper surface of a horizontally disposed circular ring member 47 which is secured to the bottom of the vertically extending ring member 32 by means of the bolts 34. The bracket members 44 are thus positioned relative to the main frame 12 so as to be rotatable 360° about a vertical axis but are restrained from substantial vertical movement relative to such frame.

The bracket members 44 each are semi-circularly shaped at their mid-points as at 46 to form one-half of a bearing retainer, the other half of which is formed upon a bifurcated fork member 48 which straddles the wheel 30 and serves as a support for the drive motor unit 28.

The resilient mounting of the shafts 40 permits limited fore and aft and vertical floating movement of the drive motor 28 and the wheel 30 relative to the main frame 12 of the truck 10 so as to thereby reduce chatter during changes in direction of the truck. In order to further reduce and substantially eliminate chatter, the resilient members 42 are preferably pre-stressed during assembly within the main frame. Such pre-stressing is conditioned by forming the diameter of the vertical leg 35 of the circular ring 33 smaller than the diameter of a circle which is tangent to the outer vertically disposed peripheral surfaces 39 of rollers 38 when the wheel 30 and drive motor unit 28 are demounted from the main frame 12. Likewise the vertical distance between the bottom of the lugs 45 and the horizontally disposed peripheral surfaces 41 of the rollers 38 is made so as to be slightly greater than the vertical distance between the top of the ring member 47 and the inner surface of the horizontally extending leg 36 of the ring 33 when the wheel is demounted. Then, the rollers 38 as they are positioned into engagement within the frame 12, are moved radially inwardly of their normal free positions, and the desired stress in the resilient mountings is thereby attained.

To effect rotation of the drive motor unit 28 and the wheel 30 about a vertical axis, the fork member 48 is provided, on each leg thereof, with a mounting lug 50 (FIG. 3) to which is secured, conveniently by bolting, a circular sprocket 52. The sprocket 52 is formed with teeth 54 on the periphery thereof for engagement with a conventional endless chain 56 (FIG. 2) which is trained over a second sprocket 58. The sprocket 58 is suitably secured for rotation upon a steering column 60 extending upwardly through the operator's platform 24 and carrying at its terminal end a conventional steering wheel 62.

By virtue of the above-described arrangement, the steering wheel may be turned indefinitely in any direction and the wheel 30 and drive motor unit 28 will also be revolved in predetermined relation to the magnitude of such turning depending on the ratio between the sprockets 52 and 58.

Figure 1:
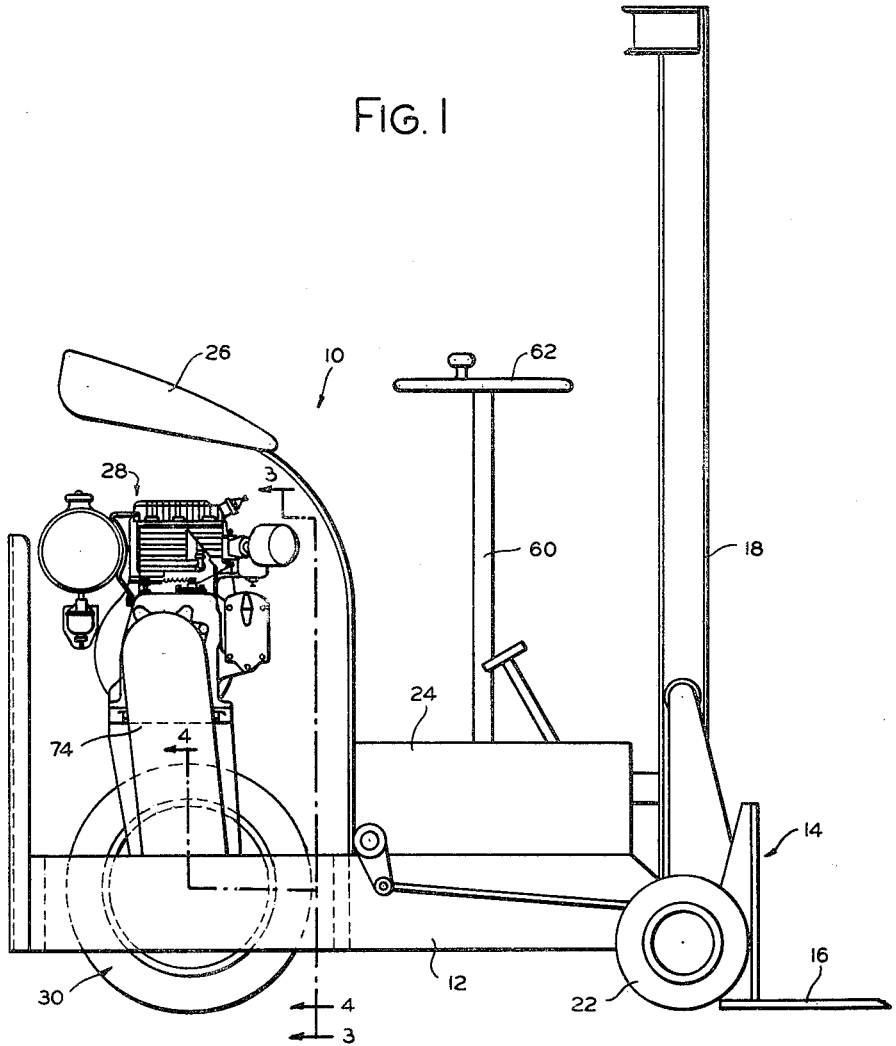
FIG. 1 is a side elevational view of a powered lift truck embodying the novel drive and steering wheel arrangement of the present invention.

The drive motor unit 28 is herein shown as an internal combustion engine having an output shaft 64 to which is suitably secured a sprocket 66. The motor may, if desired, be of the electrical battery operated type which would be provided with suitable electrical wiring including a collector ring or the like to allow for unlimited rotation of the motor about its vertical axis in any one direction. The sprocket 66 drives an endless chain 68 which is also trained over a sprocket 70 suitably secured upon a shaft 72 for driving the ground engaging wheel 30. As may be seen in FIG. 1, the sprockets 66 and 70 together with the chain 68 are suitably enclosed within a protective cover element 74 to prevent injury to persons coming into close proximity to the truck 10.

Referring now to FIG. 4, the structure and operation of the ground engaging wheel 30 will now be described in detail. The shaft 72 which is driven by the chain and sprocket connection above-described from the drive motor unit 28 comprises the input shaft of a torque converter generally designated by the reference numeral 76.

The torque converter 76 is of substantially conventional type comprising three vaned elements, namely an impeller 78, a turbine 80, and a stator 82. The impeller 78 is secured by conventional means for rotation along with the input shaft 72, and the turbine 80 is connected to a driven shaft 84. The stator 82 has an overrunning connection to a reaction sleeve 86 through the medium of a one-way sprag type clutch 88 of a type well-known in the art. The reaction sleeve 86 is connected to hub 130 for rotation therewith by means of a press fit, although a keyed or splined connection could alternatively be used. The reaction sleeve 86 is mounted for rotation relative to shaft 84 by means of a suitable bearing 89. It will be appreciated that during operation of the lift truck the reaction sleeve 86 will rotate counterclockwise, as viewed from the left in FIG. 4, along with hub 130, rather than remain stationary as is usually the case with reaction sleeves for torque converters.

The impeller 78 may be formed of two annular and generally dish-shaped members 90 and 92 in axial alignment. The member 92 is in the form of a dish having a peripheral portion which substantially follows the contour of the turbine 80 and is secured to the member 90 by any suitable means. Also secured to the member 90 is an additional annular plate 94 which is keyed by key 95 to the input shaft 72 to form the driving connection to the impeller 78. The member 90 may comprise a shell of semi-toroidal shape and a core ring of generally similar shape having vanes extending between and connected to the shell and core ring. The turbine 80 also comprises a semi-toroidal shell and core ring having vanes extending between and secured to the shell and core ring. The stator 82 comprises vanes extending between a shell and core ring.

It will be understood by those skilled in the art that the shell and core ring of each vaned element described above are both annular and complete rings, although only portions of the shells and core rings are illustrated in the drawing and the vanes may be curved and of varying thickness. The three vaned elements form and function as a hydrodynamic torque converter with the vanes of the impeller 78 functioning to impart energy to a body of fluid or liquid in a chamber 96, formed by the members 90 and 92, the turbine 80 receiving energy from the fluid, and stator 82 functioning as a reaction element by the one-way clutch 88 to change the direction of the flow of fluid so that the device functions to multiply the torque until such time that the change in direction of fluid leaving the turbine 80 and entering stator 82 in the fluid circuit, indicated by the arrows, causes the stator shell to be released by the one-way clutch 88 to provide a substantially direct drive between the input shaft 72 and the driven shaft 84.

Figure 6:
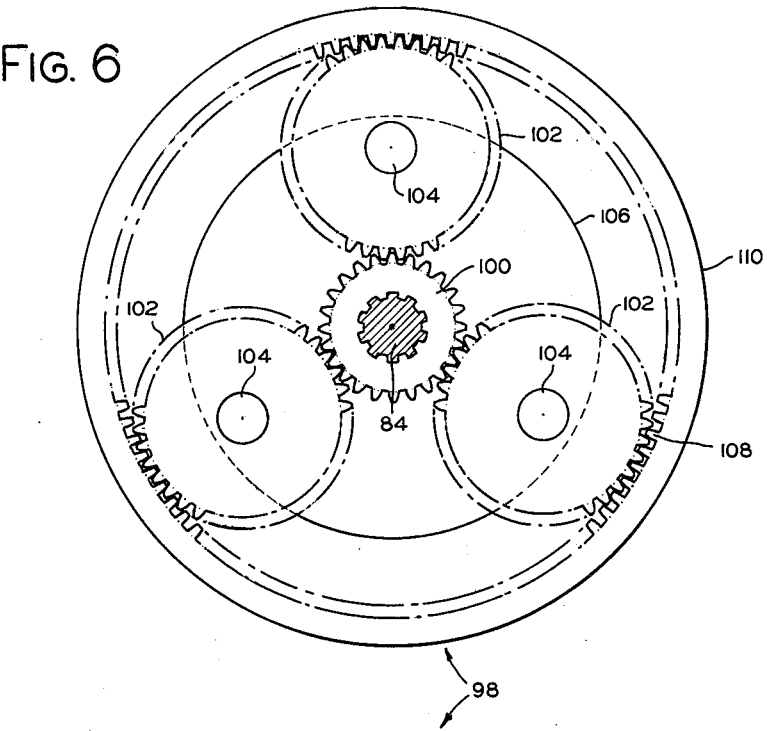
FIG. 6 is an elevational view of one planetary gear stage substantially as viewed along the line 6—6 of FIG. 4.
Figure 7:
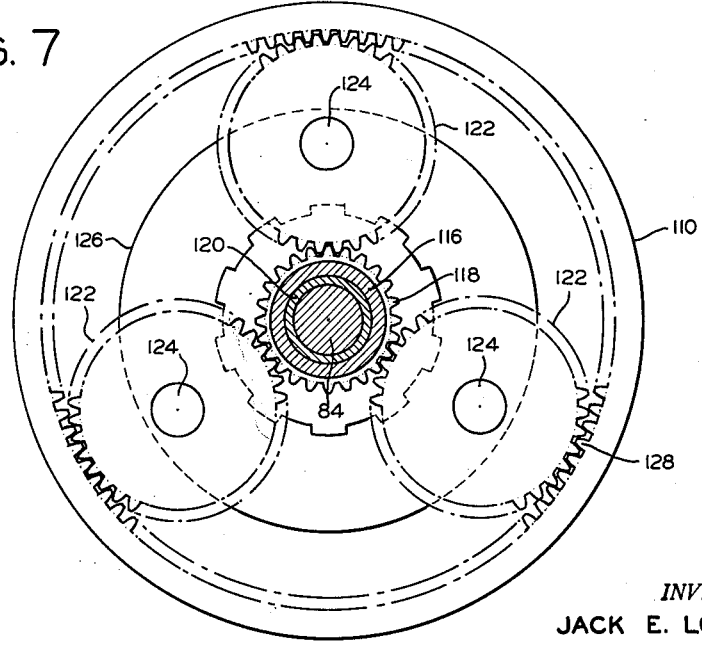
FIG. 7 is an elevational view of a second planetary gear stage substantially as viewed along the line 7—7 of FIG. 4.

The driven shaft 84 forms the input shaft of a double planetary gear reduction unit, generally indicated by the reference numeral 98, which provides the necessary reduction for driving the ground engaging wheel as will appear presently. This double planetary type of gear reduction is of the substantially conventional type heretofore widely used in transmissions. However, to make the operation clear the individual parts will be described in connection with FIGS. 4, 6 and 7.

The double planetary gear reduction unit 98 consists of a first sun gear 100 which is splined to the shaft 84 and thus forms a part thereof. Spaced around the sun gear 100 and meshing therewith are three planet pinions 102 which are rotatably mounted upon pins 104 in a planet carrier 106. The planet pinions 102 also mesh with a ring gear 108 which is formed as an integral part of a cylindrical wall member 110 which, together with a pair of annular end wall members 112 and 114, form a housing for the gear reduction unit 98.

The planet carrier 106 is formed with an axially projecting hub 116 having teeth on the external portion thereof which form a second sun gear 118. The hub 116 is rotatably mounted relative to the shaft 84 by means of a suitable bearing or bushing 120. Spaced around the sun gear 118 and meshing therewith are three planet pinions 122 which are rotatably mounted upon pins 124 in a second planet carrier 126. The planet pinions 122 also mesh with a second ring gear 128 which is also formed as an integral part of the cylindrical wall member 110 and may form a continuation of the ring gear 108. The second planet carrier 126 is splined to a hub 130 which forms the hub for wheel 30 and projects axially from an annular wall which forms the disc 132 of wheel 30. Integrally formed with the wheel disc 132 is an axially projecting cylindrical wall forming the rim 134 of wheel 30. Upon the rim 134 is mounted a suitable traction element or tire 136 formed of rubber or other suitable material.

The rim 134 is provided at one end thereof with a radially outwardly extending flange 138 which is formed to cooperate with an annular wall forming a second disc 140 for the wheel 30. The flange 138 and the disc 140 are provided with a plurality of circumferentially spaced apertures for the reception of bolts 142 to secure them together. The disc 140 is suitably journaled for rotation upon the shaft 72 by means of a roller bearing 144 which is suitably retained within an axially projecting hub 146 which forms a second hub for the wheel 30.

As previously mentioned, the bracket members 44 together with the fork member 48 have portions collectively forming bearing retainers. Such retainers are adapted and arranged to receive a pair of bearings for the wheel 30, one of which is shown at 148 in FIG. 4 and which is carried upon the wheel hub 146. A similar bearing (not shown) is provided adjacent the end of the gear reduction unit 98 and is carried upon a hub 150 which is suitably secured to the annular wall 112 and is journaled upon the end of shaft 84 by means of a bearing 152.

With the structure and arrangement as above described, the output of the motor power unit 28 is applied as torque to the impeller 78 of the torque converter 76 which imparts energy to a body of fluid, the turbine 80 receiving such energy and being rotated to apply torque to the shaft 84. By virtue of the first stage planetary gear reduction comprising the sun gear 100, planet pinions 102, and ring gear 108, the carrier 106 will be rotated in the direction of the applied torque at a much reduced speed. The second stage planetary gear reduction comprising the sun gear 118, planet pinions 122 and ring gear 128 will cause the carrier 126 to be rotated in the direction of the applied torque at a considerably further reduced speed. The wheel 30 is, of course, driven at such final reduced speed inasmuch as the hub 130 thereof is directly connected for rotation with the second carried 126.

It should be noted that with the above-described arrangement the torque converter 76 will automatically adjust the driving or output torque applied to the wheel 30 to meet the driving conditions encountered by the truck while a constant input torque is supplied thereto. For example, assuming a constant input torque supplied to the shaft 72 by the drive motor unit 28, when the truck is first started the torque converter 76 will supply a highly multiplied torque to the shaft 84 and thus to the rear reduction unit 98. As the speed of the turbine 80 increases and the load of starting the truck decreases, the torque multiplication will be reduced until substantially a one-to-one or direct drive ratio exists between the impeller 78 and the turbine 80. If the truck is driven over terrain requiring additional torque, such as inclines, the speed of the turbine will decrease with the additional load and the torque will again be multiplied to meet such conditions without affecting the output of the motor drive unit 28. With this arrangement there is little likelihood of stalling the motor drive unit 28, when inclines are encountered during movement of the truck.

It is known that previous arrangements have been proposed wherein motors would be provided directly in the wheel of a vehicle of the type herein described in order to conserve space. Such motor-in-wheel constructions would not be as effective as the structure of the present invention wherein a torque converter is installed directly within the wheel inasmuch as the automatic torque adjustment feature above-described would be lacking therein.

By mounting the torque converter directly within the confines of the wheel in the present invention as above described, the torque demand does not go outside of the wheel itself and, therefore, a much more efficient operation is obtained than would be the case if the torque converter were mounted outside of the confines of the wheel.

It should be noted that the housing for the planetary gear reduction unit 98, comprising the cylindrical wall member 110 and the annular wall members 112 and 114 forms an enclosed chamber which is rotatable independently of the wheel 30 upon the bearing 152. This enclosed chamber forms a reservoir 154 which is adapted to contain a quantity of fluid such as oil. The oil contained within the reservoir 154 serves as a lubricant for the planetary gear reduction unit 98 and also as the fluid supply for the torque converter 76.

As is well-known in the torque converter art, the vaned members, i.e., impeller 78, turbine 80 and stator 82 when in operation, set up a vortex for the circulation of fluid within the toroidal space 96. There are thus effected zones of differing pressures within the space 96. To provide for circulation of fluid between the reservoir 154 and the torque converter 76, the wheel hub 130 is provided with a duct 156 which directs the fluid in a path as shown by the arrows in FIG. 4 radially inwardly through suitable apertures 158 formed near the axial mid-point of the reaction sleeve 86, and thence axially through an annular passage 159 defined between the reaction sleeve and an inner coaxial sleeve 160. The fluid then passes from the annular passage 159 radially outwardly through apertures 161 formed in the reaction sleeve 86 and into the path of the impeller 78. At the same time, fluid is forced out of the toroidal space 96 at a point 162 beneath the reaction member 82 and radially inwardly into the open end of the reaction sleeve 86 and thence through the annular space between the inner coaxial sleeve 160 and the shaft 84. The fluid then passes radially outwardly through additional apertures 164 formed adjacent the end of the reaction sleeve 86 and thence axially through an annular passage formed between the reaction sleeve and the wheel hub 130 where it is delivered back into the reservoir 154.

With the structure and arrangement as above described there is thus provided a continuous circulation of the fluid from the reservoir 154 to the toroidal space 96 of the torque converter 76 and back to the reservoir 154, without requiring the provision of a separate pump for supplying fluid to the torque converter. Since a certain amount of slip is always present in a fluid coupling such as the torque converter 76, some heat is generated which must be dissipated. By virtue of such continuous circulation of fluid there is effected a partial cooling of the fluid since a portion of the hot fluid in the torque converter 76 is continuously being replaced by cooler fluid from the reservoir 154. Some of the heat in the fluid will be dissipated within the reservoir 154 prior to recirculation thereof into the torque converter 76. Suitable means such as the oil seals 166 and 168 will, of course, be provided to prevent leakage of fluid from the reservoir 154 and the torque converter 76.

Additional means may also, if desired, be provided to dissipate heat from the torque converter which will now be described. Upon inspection of FIG. 4 it may be noted that the wheel disc 132 is provided with a plurality of circumferentially spaced apertures 170 forming inlets for circulation of air. Upon the exterior surface of the impeller 78 there are formed a plurality of radially extending vanes 172, and the annular wheel disc 140 is provided near its periphery with a plurality of circumferentially spaced apertures 174 forming outlets for circulating air.

In operation, air which follows the path designated by the dotted line arrows in FIG. 4, is drawn in between the cylindrical outer wall 110 of the gear reduction unit 98 and the wheel rim 134 and, thence radially inwardly along the end wall 114 thereof. The air then passes through the apertures 170 in the wheel disc 132 at the radially inner ends of the vanes and is then expelled radially outwardly and then axially through the apertures 174 in the wheel disc 140. It will be noted that the wheel disc 132 is suitably formed so as to provide a shroud which directs the air over the curved or sloping surface of the torque converter housing and causes it to be expelled in an axial direction tangentially of the surface, thereby providing a high efficient fan which permits a substantial amount of heat to be extracted or dissipated per unit volume of air handled. It should also be noted that the air is directed in a path such that it comes into contact with a major portion of the exterior surfaces of both the reservoir 154 and the torque converter 76 and thus will dissipate heat from the fluid circulating throughout the entire structure.

Since the wheel 30 and the motor drive unit 28 are mounted for rotation as a unit relative to the main frame 12, as previously described, it will be readily appreciated that the wheel 30 with the torque converter 76, and gear reduction unit 98 is equally efficient in driving the truck 10 in either a forward direction or a reverse direction and that it is not necessary, therefore, to provide either change speed gear mechanisms or reverse gear mechanisms.

It should now be apparent to those skilled in the art that the present invention thus provides a structure and arrangement which is novel, highly efficient, rugged, dependable and economical to manufacture and which accomplishes the objects stated at the beginning of this description.

While only one illustrative embodiments of the present invention has been herein shown and described, it will be obvious that the invention is capable of many alterations, changes in mechanical equivalents and alternative embodiments without departing from the true sipirt thereof. It is, therefore, not intended that the invention should be restricted or limited to the particular embodiment shown and described; nor otherwise than by the terms of the appended claims.

I claim:
1. A driving wheel assembly for a vehicle having a power means comprising, in combination, a rotatably mounted wheel, said wheel including a tire rim and a pair of axially spaced radially extending disc elements, a shaft driven from the vehicle power means, hydraulic power transmission means connected to said shaft and being enclosed between said tire rim and said disc elements, speed reduction gearing means interconnecting said transmission means and said wheel, means including one of said disc elements defining a fluid containing enclosure for said gearing means, passage means including a portion extending through said one disc element defining a path for circulation of hydraulic fluid between said enclosure and said transmission means, air circulating vane means driven by said transmission means, and conduit means including said vane means and openings in said disc elements for circulating air adjacent said enclosure and said transmission means.

2. The combination as specified in claim 1, wherein said hydraulic power transmission means comprises a hydrodynamic torque converter including impeller and turbine elements.

3. The combination as specified in claim 2, wherein said air circulating vane means are formed as an integral part of said impeller element.

4. The combination as specified in claim 1, wherein said enclosure is annular and concentric with said tire rim and a portion of said conduit means is formed between said tire rim and said enclosure.

5. A driving wheel assembly for vehicle having a power means comprising, in combination, a rotatably mounted wheel having a pair of axially spaced radially extending disc elements, a shaft driven from the vehicle power means, hydraulic power transmission means connected to said shaft and positioned between said disc elements, said hydraulic power transmission means including a fluid chamber, speed reduction gearing means interconnecting said transmission means and said wheel, means including a portion of one of said disc elements defining a fluid containing enclosure for said gearing means, passage means extending through said one disc element forming a portion of a closed fluid circuit for circulation of fluid between said enclosure and said chamber, and tortuous passage means for circulation of air to dissipate heat from fluid circulating between said enclosure and said chamber, said tortuous passage means including apertures in said disc elements.

References Cited by the Examiner
UNITED STATES PATENTS

| | | | |
|---|---|---|---|
| 1,346,915 | 7/20 | Sauvage | 180—26 |
| 1,822,555 | 9/31 | Weiss | 74—688 |
| 2,203,177 | 6/40 | Patterson | 74—677 |
| 2,335,544 | 11/43 | Schnetzer. | |
| 2,523,619 | 9/50 | Grebb | 74—688 |
| 2,588,078 | 3/52 | Black | 280—125 |
| 2,598,876 | 6/52 | Ash. | |
| 2,645,298 | 7/53 | Hawkins et al. | 180—66 |
| 2,649,162 | 8/53 | Woolridge et al. | 180—13 |
| 2,673,746 | 3/54 | Thompson | 280—125 |
| 2,737,061 | 3/56 | Kelley | 74—677 |
| 2,747,429 | 5/56 | Butler | 74—688 |
| 2,762,444 | 9/56 | Gardner | 180—13 |
| 2,899,005 | 8/59 | Speicher | 180—10 |
| 2,957,533 | 10/60 | Lewis et al. | 180—26 |
| 2,978,053 | 4/61 | Schmidt | 180—26 |

A. HARRY LEVY, *Primary Examiner.*

PHILIP ARNOLD, KENNETH H. BETTS, *Examiners.*